(12) United States Patent
Yanou et al.

(10) Patent No.: US 8,080,160 B2
(45) Date of Patent: Dec. 20, 2011

(54) PITCHER TYPE WATER PURIFIER AND PURIFICATION CARTRIDGE FOR THE WATER PURIFIER

(75) Inventors: Manabu Yanou, Tokyo (JP); Yukio Kobayashi, Tokyo (JP); Yoshinori Kawai, Tokyo (JP); Yuuichi Katsuura, Tokyo (JP); Masanori Itou, Aichi-ken (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 10/451,275

(22) PCT Filed: Dec. 18, 2001

(86) PCT No.: PCT/JP01/11087
§ 371 (c)(1),
(2), (4) Date: Jun. 20, 2003

(87) PCT Pub. No.: WO02/051755
PCT Pub. Date: Jul. 4, 2002

(65) Prior Publication Data
US 2004/0060873 A1  Apr. 1, 2004

(30) Foreign Application Priority Data

Dec. 25, 2000 (JP) ................. 2000-393108

(51) Int. Cl.
*B01D 63/02* (2006.01)
*B01D 41/02* (2006.01)
*B01D 61/18* (2006.01)
*B01D 61/00* (2006.01)

(52) U.S. Cl. ........... 210/321.6; 210/500.23; 210/321.89; 210/323.2; 210/502.1; 210/694

(58) Field of Classification Search ............... 210/257.2, 210/258, 259, 262, 266, 282, 416.3
See application file for complete search history.

(56) References Cited

U.S. PATENT DOCUMENTS

| 146,590 | A | * | 1/1874 | Heinz | 210/266 |
| 3,528,553 | A | * | 9/1970 | Caracciolo | 210/321.9 |
| 4,054,526 | A | * | 10/1977 | Muller | 210/245 |
| 4,308,654 | A | * | 1/1982 | Bogart | 29/451 |

(Continued)

FOREIGN PATENT DOCUMENTS

JP  1-083491 Y2  2/1989

(Continued)

*Primary Examiner* — Krishnan S Menon
(74) *Attorney, Agent, or Firm* — Fitch, Even, Tabin & Flannery

(57) ABSTRACT

In a combination including a pitcher-type water purifier and its purification cartridge, which can adsorb and eliminate chemical substances such as chlorine from raw water, eliminate bacteria, and prevent propagation of bacteria and provide safe purified water in a short period of time, even when the purified water has been stored for a long-period time, the pitcher type water purifier contains a casing divided into upper and lower parts as a raw water reservoir portion and a purified water reservoir portion, and has a purified water pouring opening in the purified water reservoir portion; and the purification cartridge has a raw water inlet in an upper face thereof and a purified water outlet in a bottom face, and adsorbent is filled in an upper layer of an interior thereof and hollow fiber membranes are filled in a lower layer thereof at an opening rate σ of 25-58%.

5 Claims, 8 Drawing Sheets

U.S. PATENT DOCUMENTS

| | | | |
|---|---|---|---|
| 4,998,228 A | 3/1991 | Eger et al. | 368/10 |
| 5,019,252 A | 5/1991 | Kamei et al. | 210/136 |
| 5,733,448 A * | 3/1998 | Kaura | 210/238 |
| 5,830,360 A * | 11/1998 | Mozayeni | 210/651 |
| 6,405,875 B1 * | 6/2002 | Cutler | 210/477 |
| 6,569,329 B1 * | 5/2003 | Nohren, Jr. | 210/282 |
| 6,638,426 B1 * | 10/2003 | Fritter et al. | 210/266 |
| 7,438,799 B2 * | 10/2008 | Vandenbelt et al. | 210/85 |
| 2002/0125187 A1 * | 9/2002 | Tanner et al. | 210/418 |
| 2002/0134715 A1 * | 9/2002 | Tanner et al. | 210/85 |
| 2004/0060873 A1 * | 4/2004 | Yanou et al. | 210/660 |
| 2004/0149642 A1 * | 8/2004 | Vandenbelt et al. | 210/282 |
| 2004/0173507 A1 * | 9/2004 | Tanner et al. | 210/85 |
| 2005/0252844 A1 * | 11/2005 | Chau | 210/282 |
| 2006/0157399 A1 * | 7/2006 | Vandenbelt et al. | 210/282 |
| 2006/0163148 A1 * | 7/2006 | Hengsperger et al. | 210/473 |
| 2006/0163169 A1 * | 7/2006 | Eckhardt et al. | 210/748 |
| 2006/0191824 A1 * | 8/2006 | Arett et al. | 210/85 |
| 2006/0226064 A1 * | 10/2006 | Beckman et al. | 210/323.1 |
| 2006/0231476 A1 * | 10/2006 | Vandenbelt et al. | 210/266 |

FOREIGN PATENT DOCUMENTS

| | | |
|---|---|---|
| JP | 64-001789 Y2 | 6/1989 |
| JP | 5-15993 A | 4/1993 |
| JP | 5-228345 | 9/1993 |
| JP | 8-84764 | 4/1996 |
| JP | 11-319799 A | 11/1999 |
| WO | WO 00/64560 A | 11/2000 |
| WO | WO 00/75076 A | 12/2000 |
| WO | WO 01/93991 A | 12/2001 |

* cited by examiner

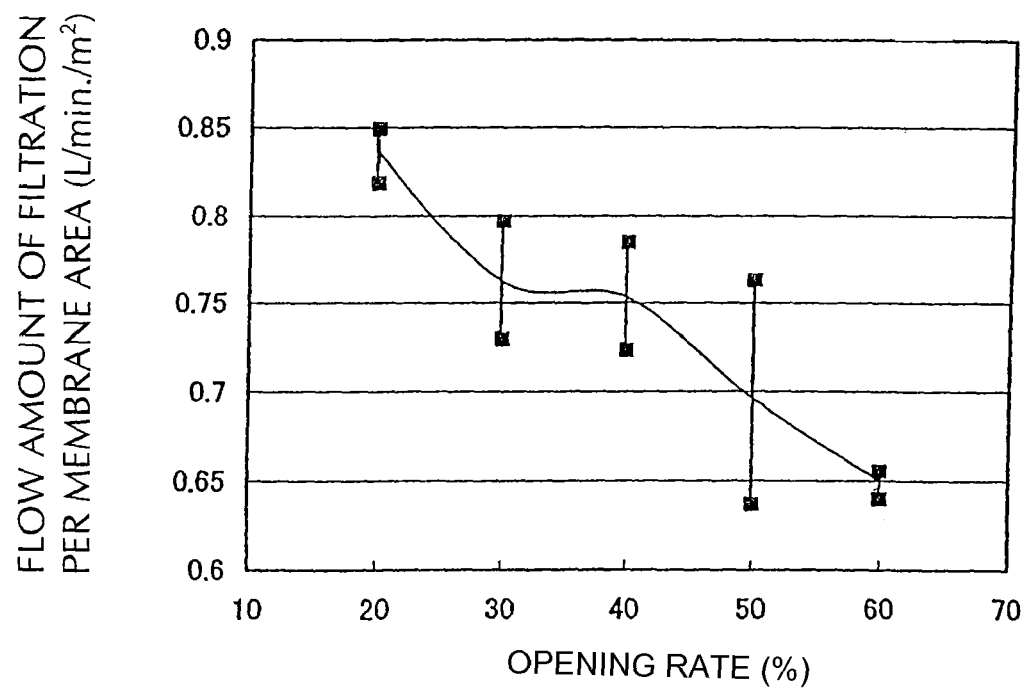

PITCHER TYPE WATER PURIFIER AND PURIFICATION CARTRIDGE FOR THE WATER PURIFIER

CROSS-REFERENCED APPLICATIONS

This application is the National phase of International Application PCT/JP01/11087, the complete disclosure of which is incorporated herein by reference, filed 18 Dec. 2001, which designated the U.S. and that International Application was not published under PCT Article 21(2) in English.

TECHNICAL FIELD

The present invention relates to a pitcher type water purifier that enables purifying a relatively large amount of raw water at one time and a casing of that is formed with a purified water pouring opening, and a replaceable purification cartridge that is used with the water purifier.

BACKGROUND ART

Various kinds of pitcher type water purifiers have hitherto been proposed which can purify a relatively large amount of raw water of approximately 1 to 2 liters at one time, which can be kept in custody in, for example, a refrigerator, and which is formed with a pouring opening from which water is poured into a cup.

For example, a pitcher type water purifier that is disclosed in Japanese Patent Application Laid-Open No. H-11-319799 is constructed in the way the water purifier has a casing having a pouring opening and a handle and the interior thereof is partitioned into upper and lower parts, as a raw water reservoir portion and a purified water reservoir portion, with a partition wall, a part of that has openings, being interposed between the both portions. And, on the bottom portion of the raw water reservoir portion, a circular-columnar purification cartridge is disposed in the way of being replaceable and in a state where the cartridge as a whole is kept projecting into the purified water reservoir portion. The purification cartridge has a raw water inlet shaped like a mesh at its upper part and has a purified water outlet shaped like a mesh at its bottom part, and activated carbon and/or ion-exchange resin are filled in its interior as adsorbent. In some cases, in place of ordinary activated carbon, antibacterial activated carbon is filled.

In the above-described pitcher type water purifier, the raw water that has been supplied into the raw water reservoir portion at the upper part of the casing is passed through the purification cartridge under a water pressure that corresponds to its own weight. At this time, through the action of adsorbent such as activated carbon, ion-exchange resin, and the like, organic substances such as residual chlorine, chlorinated odor, mold odor, and trihalomethane, and impurities such as heavy metal or aluminum, which are contained in the raw water, are eliminated, whereby the water is purified. Thereafter, the water is stored into the purified water reservoir located at the lower part.

However, as the conventional pitcher type water purifiers, there is only a type wherein adsorbent such as activated carbon or ion-exchange resin filled in the purification cartridge eliminates, due to the action of adsorption, etc., the chemical substances in the raw water. Further, in the purification cartridge, for the purpose of preventing such adsorbent from flowing out into the outside thereof, a main body thereof is constructed in the form of a mesh and in addition a filtering material with coarse mesh such as non-woven fabric is disposed therein. For that reason, conversely, bacteria or microbes are likely to propagate themselves. The conventional water purifier could not eliminate substances even up to such very fine substances.

Ordinarily, in the water of the public water line, in order to prevent the bacteria contamination, there is added thereto chemicals such as chlorine, as disinfectant that has strong sterilizing effect, less harm to the human body, and a high residual effect. Thereby, that water is managed. However, it is the point in time when it has been just supplied from the tap. In contrast to this, in the case of a pitcher type water purifier, according to the use thereof, there is also a case where it is stored in a refrigerator for a long period of time such as one week or so. Therefore, although it is stored as low-temperature storage, in a case where residual chlorine is eliminated by adsorbent such as activated carbon and as a result a minute amount of bacteria or microbes exist in the water having had the sterilizing effect lost, the following possibility exists. Namely, during such storage, such bacteria or microbes will propagate themselves and, in some cases, they will have propagated themselves up to the concentration that has effect upon the human body.

In order to eliminate those bacteria or microbes as well, as in the case of, for example, a cup-type portable water purifier disclosed in Japanese Utility Model Application Laid-Open No. H-5-15993 or an ordinary directly-connected-to-tap type water purifier, filling a hollow fiber membrane within a purification cartridge and thereby filtering such bacteria or microbes through the use of that hollow fiber membrane are effective.

By the way, in the hollow fiber membrane, in terms of its structure, in a case where the water pressure is low, the water passage rate is very low. Therefore, conventionally, as in the case of the cup-type water purifier disclosed in the said Japanese Utility Model Application Laid-Open No. H-5-15993, the use of it was limited to the cases where the amount of water that is to be purified at one time was small and, also, as in the case of the directly-connected-to-tap water purifier, the use of it was limited to the case where the water pressure from the tap was utilized.

However, the pitcher type water purifier purifies such a relatively large amount of water as to an extent of 1 to 2 liters or so, or at least 500 milliliters or so. In addition, the pressure of that water is only the weight alone of the raw water, itself, that is stored in the raw water reservoir portion that is located at the upper part. For that reason, in the case of having filled the hollow fiber membrane into within the purification cartridge of the above-described pitcher type water purifier, the time for processing the water becomes very long. In the case of the pitcher type water purifier in which using it immediately after supply of the water is also taken into account, the demerit that a long time is needed for purification processing is a very serious problem.

The present invention has been achieved in order to solve the above-described problems and has an object to provide a pitcher type water purifier and a purification cartridge for use therewith, which can purify a relatively large amount of raw water, that is to an extent of at least 500 milliliters or so, in a short period of time, which purifier and cartridge not only adsorb and eliminate organic substances such as residual chlorine, chlorinated odor, mold odor and trihalomethane, and impurities such as heavy metal and aluminum, but also 0.1 μm or more of very fine particles including bacteria or microbes and, even when storing the purified water for a long period of time, can prevent bacteria or microbes from propagating themselves and therefore can ensure a purification performance of high safety in terms of sanitation.

DISCLOSURE OF THE INVENTION

To achieve the above object, a first aspect of the invention provides a pitcher type water purifier comprising a casing that is divided into upper and lower parts, as a raw water reservoir portion and a purified water reservoir portion, the casing having a purified water pouring opening that is communicated with the purified water reservoir portion; and a purification cartridge replaceably disposed between the raw water reservoir portion and the purified water reservoir portion and having a raw water inlet open to the raw water reservoir portion and a purified water outlet open to the purified water reservoir portion, characterized in that adsorbent is filled in an upper layer of the interior communicated with the raw water inlet and hollow fiber membranes are filled in a lower layer thereof; and the opening rate σ of the hollow fiber membranes is 25-58%.

Incidentally, assuming that S represents the cross-sectional area of the space of filling of the hollow fiber membranes in the purification cartridge; A represents the cross-sectional area of the outside diameter of a single hollow fiber membrane; and F represents the number of openings of the hollow fiber membranes, the opening rate σ of the hollow fiber membranes can be determined using the following equation.

$$\sigma(\%) = \{(A \times F)/S\} \times 100$$

In this water purifier, first, raw water is supplied to the raw water reservoir portion. This raw water, due to its own weight, is introduced from the raw water inlet of the purification cartridge into the purification cartridge and, first, is contacted with adsorbent filled in the upper layer of the interior. Through the action of this adsorbent, organic substances such as residual chlorine, chlorinated odor, mold odor and trihalomethane, and impurities such as heavy metal and aluminum are adsorbed and eliminated.

As adsorbent, there are a powdered adsorbent, a granulate adsorbent prepared by granulating the powdered adsorbent, a fibrous adsorbent, etc. As such adsorbents, there are known adsorbents that include inorganic adsorbents such as natural material adsorbents (natural zeolite, silver zeolite, acidic china clay, etc.), and synthetic material adsorbents (synthetic zeolite, bacteria-adsorbing polymer, phosphor ore, molecular sieve, silica gel, silica alumina gel-based adsorbent, porous glass, etc.), organic adsorbents such as powdered activated carbon, granule activated carbon, fibrous activated carbon, block-like activated carbon, extrusion-molded activated carbon, formed activated carbon, molecule-adsorbing resin, synthetic material-based granule activated carbon, synthetic material-based fiber-like activated carbon, ion-exchange resin, ion-exchange fiber, chelate resin, chelate fiber, high-absorption resin, high water-absorption resin, oil-absorption resin, oil-absorbing agent, etc. Above all, activated carbon, which has excellent adsorbing effect for residual chlorine, organic compounds such as mold odor and trihalomethane in raw water, is suitably used. Among activated carbons, fiber-like activated carbon is suitably used because the area of contact with the liquid to be filtered is large and the adsorbing effect and water-passing capability are great.

As the activated carbon, there are, for example, plant-matter (wood, cellulose, sawdust, charcoal, coconut palm shell charcoal, non-processed raw ash, etc.), coal-matter (peat, lignite, brown coal, bituminous coal, barley coal, tar, etc.), petroleum-matter activated carbon (petroleum leavings, sulfuric acid sludge, oil carbon, etc.), pulp spent liquor, synthetic resin, etc., which are carbonized, and, according to the necessity, subjected to gas activation (water vapor, carbon dioxide, air, etc.) or to chemical activation (calcium chloride, magnesium chloride, zinc chloride, phosphoric acid, sulfuric acid, caustic soda, KOH, etc.). As the fibrous activated carbon, there are, for example, substances which is carbonized and activated from precursor such as polyacrylonytril (PAN), cellulose, phenol, petroleum pitch.

As the activated carbon, there can be used powdered activated carbon, granular activated carbon granulated from this powdered activated carbon, granular activated carbon, fibrous activated carbon, formed activated carbon obtained by coagulating powdered and/or granular activated carbon by the use of binder. Among these, granular activated carbon is suitably used from the standpoint of its handleability and the cost. As the activated carbon, one having a filling density of 0.1-0.5 g/ml, an adsorbed amount of iodine of 800-4000 mg/g, and a granule size of 0.075-6.3 mm as its description is preferable. Further, in a case where silver is adhered to and/or mixed with the activated carbon, it can suppress the propagation of bacteria and microbes.

Next, by the hollow fiber membranes filled in the lower layer of the cartridge interior, granules, including microbes and bacteria, whose size is 0.1 μm or more, are filtered and eliminated. As the hollow fiber membranes, there can be used various kinds of porous and tubular hollow fiber membranes. There can be used ones comprised of various kinds of materials which are based on the use of, for example, cellulose, polyolefin (polyethylene, polypropylene), polyvinyl alcohol, ethylene/vinyl alcohol copolymer, polyether, polymethacrylic acid methyl (PMMA), polysulfone, polyacrylonitrile, polytetrafluoroethylene (Teflon), polycarbonate, polyester, polyamide, aromatic polyamide, etc. Among these, taking into account the handleability and processability of the hollow fiber membranes and in addition thermal disposability at the time of disposal, etc., the hollow fiber membranes based on the use of polyolefin such as polyethylene and polypropylene are preferable.

Also, although not particularly limited, preferably, the outside diameter of the hollow fiber membrane is 20-2000 μm, the pore diameter thereof is 0.01-1 μm, the porosity thereof is 20-90%, and the hollow fiber membrane thickness thereof is 5-300 μm.

Also, the hollow fiber membrane, preferably, is the so-called "permanently made-hydrophilic hollow fiber membrane" the surface of that having hydrophilic groups. When the surface of the hollow fiber membrane has hydrophobic nature, it becomes very difficult to filter and pass water with the water pressure that corresponds to the weight of the supplied water itself.

Furthermore, in some cases, air bubbles contained in the supplied water keep dwelling at the surface of the hollow fiber membrane to thereby obstruct the filtering and passing of the water therethrough and also to decrease the filtering flow rate. In such a case, the purification cartridge may be made to be one in which the hydrophobic hollow fiber membrane and the hydrophilic hollow fiber membrane co-exist, to thereby make it easy to eliminate such air bubbles.

The purified water that has been thus obtained is guided from the purified water outlet of the purification cartridge into the purified water reservoir portion, and is stored within the purified water reservoir portion. And, when necessary, the purified water is transferred from the pouring opening of the pitcher to a cup, etc.

In the above-described pitcher type water purifier, the opening rate σ of the hollow fiber membrane can be set to be 25-58%. Thereby, the water passage rate of the raw water in the purification cartridge can be increased up to around a value that makes the pitcher type water purifier usable as it. Thereby, a relatively large amount of raw water can be purified in a short period of time. In addition, by filtration using the hollow fiber membranes, even bacteria or microbes that are unable to be eliminated with the use of adsorbent such as activated carbon and ion-exchange resin are able to be eliminated. And, even in a case where the water that has had chemicals such as chlorine etc., eliminated therefrom and that has thus been purified has been stored for a long period of time, bacteria or microbes will not propagate themselves. Therefore, purified water with high safety can be preserved for a long period of time and, from the standpoint of sanitation as well, this pitcher type water purifier is extremely excellent. Further, by using a resin having antibacterial agent added thereto as the construction material for the casing and the purification cartridge, even greater effect in terms of sanitation can be achieved.

Incidentally, it is preferable that the opening rate of the hollow fiber membranes be in a range of 30-55%, and, further, it is most preferable from the standpoint of increasing the water passage rate that the opening rate of the hollow fiber membranes is in a range of 35-52%.

Here, if filling a hollow fiber membrane knitted fabric, described in Japanese Utility Model Registration No. 1994065, into the case member of the purification cartridge, because of being able to easily know the number of the hollow fiber membranes used, it is easier to manage the opening rate. In addition, since the hollow fiber membrane knitted fabrics can be easily filled as a coiled-sushi configuration or folded configuration, it is easy to manage the distances between the hollow fiber membrane knitted fabrics so that such distances may be equal. Also, the hollow fiber membranes can also be easily and evenly dispersed even if the opening rate is varied. Further, even after the hollow fiber membranes have been processed as the purification cartridge, if loosening the warp yarns in the vicinity of the end portions of one or more hollow fiber membranes that have been used as the weft yarns of the hollow fiber membrane knitted fabric, one or more hollow fiber membranes preferably become more dispersed.

A second aspect of the invention is characterized in that the casing comprises pressurizing means with respect to the raw water reservoir portion.

By the casing comprising the pressurizing means with respect to the raw water reservoir portion in this way, the raw water within the raw water reservoir portion can positively be introduced into the purification cartridge by such pressure as air pressure, with the result that the processing speed is remarkably increased.

As the above-described pressurizing means, for example, the invention in a third aspect is characterized by the pressurizing means comprising a pressurizing pump. Or, in a fourth aspect, the invention is characterized in that the pressurizing means comprises a compression spring. As each of these pressurizing means, it is possible to use a conventionally known structure.

A fifth aspect of the invention is the purification cartridge for the pitcher type water purifier that is replaceably disposed between the raw water reservoir portion and the purified water reservoir portion, which are the separated upper and lower parts inside the casing which has a purified-water pouring opening. This purification cartridge is characterized in that it has a raw water inlet which is open to the raw water reservoir portion and a purified water outlet which is open to the purified water reservoir portion, and that adsorbent is filled in an upper layer of the interior communicated with the raw water inlet and a hollow fiber membrane is filled in a lower layer thereof; and the opening rate σ of hollow fiber membranes is 25-58%.

In the above-described purification cartridge for the pitcher type water purifier, by making the opening rate of hollow fiber membranes 25-58%, it is possible to ensure the water passage rate that substantially enables the pitcher type water purifier to be used as it. Incidentally, the structure thereof is a simple one in which adsorbent is filled in the upper layer of the interior communicated with the raw water inlet and hollow fiber membranes are filled in the lower part of that interior. And the manufacturing cost is also low. In addition, the cartridge is light in weight and the replacing operation is also easy. Moreover, by providing the lug portion in the upper part, the replacing operation can be made easier.

As the purification cartridge, for example, a sixth aspect of the invention is characterized in that the purification cartridge has a columnar configuration; the upper layer thereof in which the adsorbent is filled has the raw water inlet; and the lower layer thereof in which the hollow fiber membrane is filled has the purified water outlet.

The above-described columnar purification cartridge can make the water passage channel elongate and therefore enables sufficiently ensuring the time period for contact of the raw water with adsorbent. Besides, that cartridge resembles the conventional purification cartridge for the directly-connected-to-tap water purifier in terms of the formation, and therefore can have its design easily changed when manufactured.

Or, for example, a seventh aspect of the invention is characterized in that the purification cartridge consists of a flat plate portion that has a flat surface configuration substantially the same as the bottom surface configuration of the raw water reservoir portion and a columnar portion that projects downward from the bottom surface of the flat plate portion; the flat plate portion is filled with adsorbent and the columnar portion is filled with the hollow fiber membrane; and the flat plate portion has the raw water inlet and the columnar portion has the purified water outlet.

In the purification cartridge of the invention, adsorbent is filled in the flat plate portion having the flat surface configuration substantially the same as the bottom surface configuration of the raw water reservoir portion while the raw water inlet is formed on the surface of that flat plate portion. As a result of this, raw water can be contacted with the adsorbent highly efficiently. Also, the hollow fiber membranes are filled in the columnar portion projecting downward from the flat plate portion and so the water passage rate of the hollow fiber membrane is lower than that of adsorbent. Therefore, the raw water can be made to stay in the flat plate portion for a necessary period of time, so that it is possible to sufficiently eliminate chlorine and the like by means of the adsorbent.

Also, an eighth aspect of the invention is characterized in that the purification cartridge consists of a thick plate body that has a flat surface configuration substantially the same as the bottom surface configuration of the raw water reservoir portion; and the upper layer thereof in which adsorbent is filled has the raw water inlet and the lower layer thereof in which the hollow fiber membrane is filled has the purified water outlet.

The purification cartridge consisting of the thick plate body that has the flat surface configuration substantially the same as the bottom surface configuration of the raw water reservoir portion can define the raw water reservoir portion and the purified water reservoir portion by means of this cartridge. Therefore, it is sufficient that the casing of the pitcher type water purifier is formed with a flange portion on the inner-peripheral wall surface for installing the purification cartridge. Therefore, the structure of the casing is simplified. Also, since the purification cartridge has no portion that projects into the purified water reservoir portion, it is not immersed in the purified water kept staying within the purified water reservoir portion. Therefore it is preferable from the viewpoint of sanitation as well.

These purification cartridges for the pitcher type water purifier, according to a ninth aspect of the invention, are characterized in that the amount of the adsorbent filled is 10-200 g in case of activated carbon; and the total membrane area of the hollow fiber membranes is 0.1-1.0 m$^2$.

When the filling amount of activated carbon and the total membrane area of the hollow fiber membranes are respectively in the above-described ranges, the pitcher type water purifier can sufficiently have, while ensuring the required processing speed as a pitcher type water purifier, the performance of adsorbing and eliminating chlorine or trihalomethane by means of the adsorbent and the performance of filtering and eliminating bacteria and microbes by means of the hollow fiber membranes.

Further, according to a tenth aspect of the invention, the purification cartridge is characterized in that it is dividable into the upper layer in which the adsorbent is filled and the lower layer in which the hollow fiber membrane is filled.

According to the raw water used, the service lives of the adsorbent and the hollow fiber membrane may remarkably differ. In such a case, either one of them can be replaced or reproduced to, thereby waste is avoided.

BRIEF DESCRIPTION OF THE DRAWINGS

FIGS. 3A and 3B are graphs each illustrating the correlation between an opening rate of a hollow fiber membrane and a filter performance thereof.

BEST MODE FOR CARRYING OUT THE INVENTION

Hereinafter, an explanation will be given of preferred embodiments of the present invention, concretely, with reference to the drawings.

Figure 1:
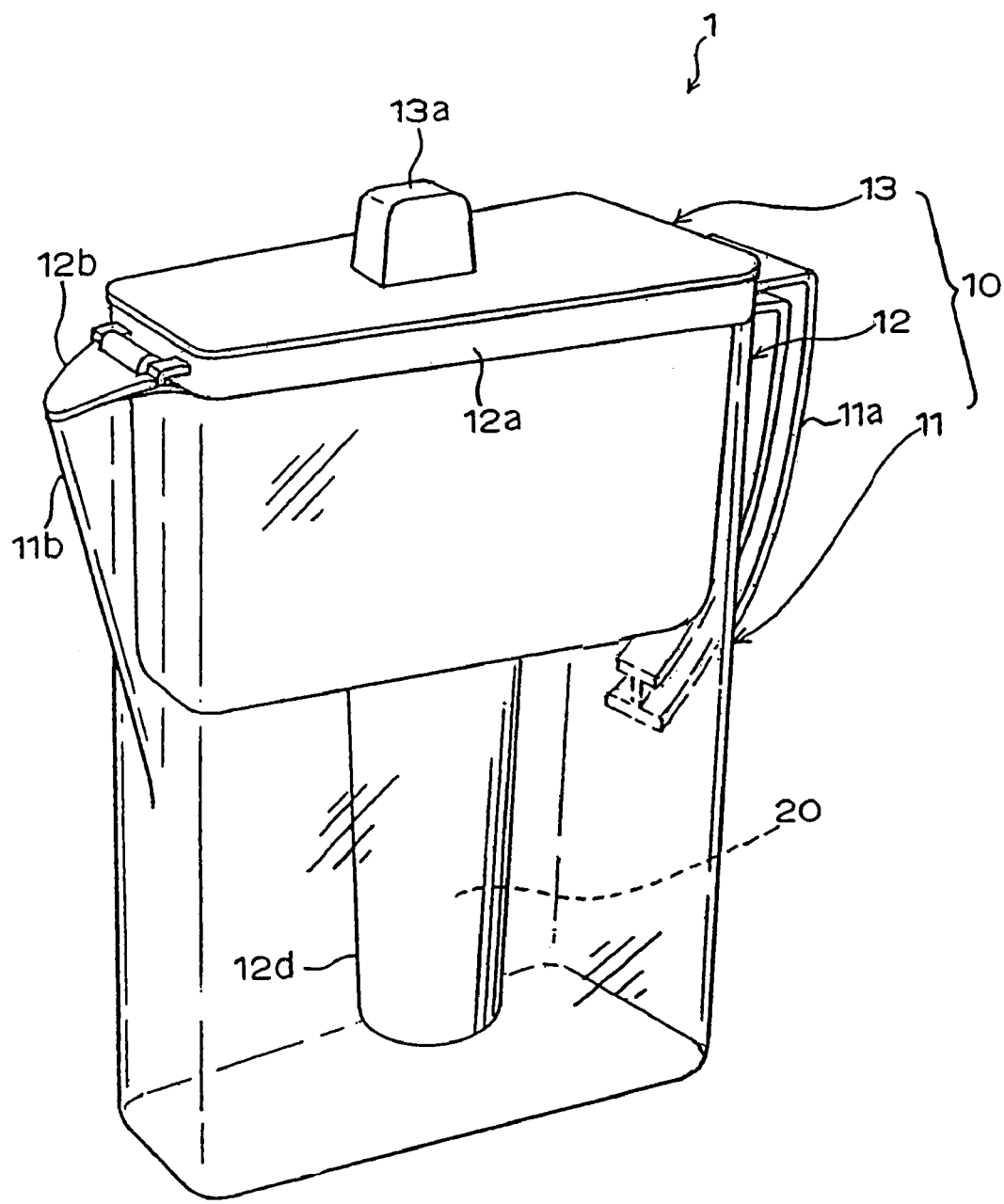
FIG. 1 is a perspective view of a pitcher type water purifier according to a first embodiment of the present invention.
Figure 2:
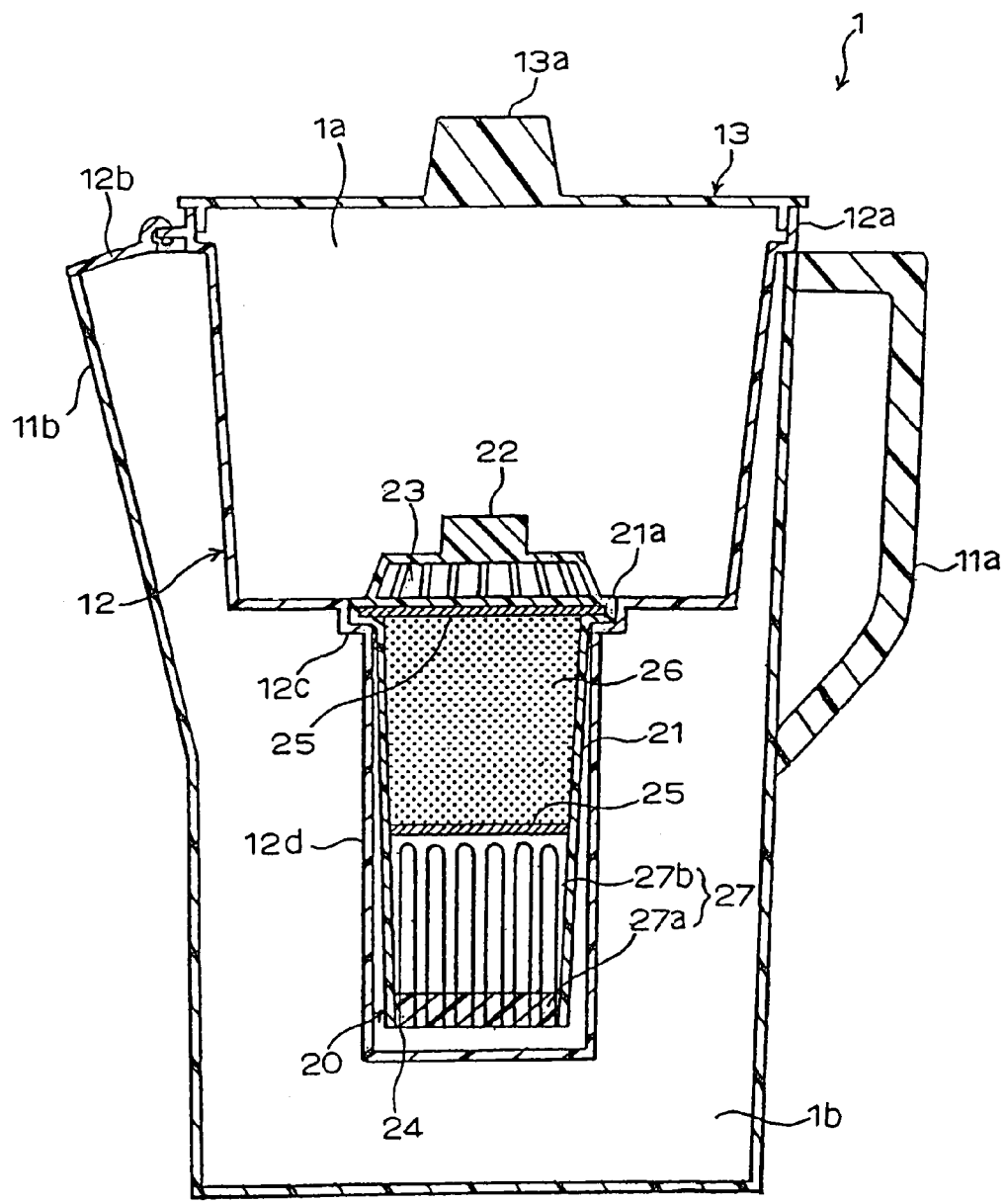
FIG. 2 is a longitudinal sectional view of the pitcher type water purifier.

As illustrated in FIGS. 1 and 2, according to a first embodiment of the present invention, a pitcher type water purifier 1 is constructed of a casing 10 and a purification cartridge 20. The casing 10 is constructed of a first main body portion 11 having a handle 11a and a pouring opening 11b, each of which has been formed integrally therewith, a second main body portion 12 that is accommodated within a substantially upper-half portion of the casing main body, and a lid member 13 having a lug portion 13a formed at its center.

The first main body portion 11 consists of a transparent casing that has a flat surface configuration, which is substantially trapezoidal. On a side wall surface corresponding to an shorter base of the trapezoid, there is formed the pouring opening 11b that is inclined from around an intermediate portion of the height thereof toward an upper end edge. On the opposite side wall surface there is formed the handle 11a.

A stepped portion 12a is formed on an upper end edge of the second main body portion 12, and this stepped portion 12a is placed upon, and engaged with, the edge of an upper end opening of the first main body portion 11. Thereby, it is accommodated within the first main body portion 11. The interior of this second main body portion 12 constitutes a raw water reservoir portion 1a while a lower half portion of the first main body portion 11 constitutes a purified-water reservoir portion 1b.

To the second main body portion 12, at a position corresponding to the pouring opening 11b of the first main body portion 11, there is hinge-connected a substantially triangular lid piece 12b that is for closing the pouring opening 11b. Further, in the central part of a bottom wall portion of the second main body portion 12 there is formed a circular opening stepped portion 12c. From this opening stepped portion 12c, a cup portion 12d is formed in the way projecting downwardly. A bottom portion of this cup portion 12d has only formed thereat for reinforcement a substantially cross-shaped beam member, whereby most part of it is open. It is to be noted that the cup portion 12d is only formed for the purpose of ensuring the strength of the second main body portion 12. Therefore, when the strength of the second main body portion 12 is ensured, the cup portion 12d may be abated and it is sufficient that the circular opening stepped portion 12c be only formed.

In the cup portion 12d of the second main body portion 12 there is accommodated the substantially circular-columnar purification cartridge 20 in a state where a flange portion 21a formed on an upper end edge thereof is being fitted in the opening stepped portion 12c. It is also possible to adopt a seal structure wherein a groove portion, into which an O-ring or a gasket or the like is fitted, is formed in either one of the flange portion 21a of the purification cartridge 20 and the opening stepped portion 12c of the second main body portion 12, both of which are closely fitted together through the use of such an O-ring, gasket, etc.

The purification cartridge 20 comprises a case member 21 the upper end of that is closed and that is substantially circular hollow cylindrical. With respect to the closed upper end portion there are formed a lug portion 22 and raw water inlets 23. On the other hand, the lower end of the case member 21, as a whole, is open and constitutes a purified water outlet 24. Right beneath the raw water inlets 23, at the position at which the flange portion 21a is formed, there is located a filter 25 consisting of a non-woven fabric. Further, at a substantially central position, as well, of the interior of the purification cartridge 20 there is disposed a filter 25 consisting of a non-woven fabric, whereby the interior of the case member 21 is partitioned into an upper part and a lower part. Adsorbent 26 is filled in the upper half part of the interior of the case member 21. In the lower half part thereof a hollow fiber membrane module 27 is fitted in a state where the end portion of the openings of the hollow fiber membrane 27b fixed using a potting material 27a is in coincidence with the purified water outlets 24.

For example, as the hollow fiber membrane 27b of the purification cartridge 20, there is used the one that has an outside diameter of 380 μm, an inside diameter of 270 μm, and a membrane thickness of 55 μm and that is made of polyethylene capable of eliminating 90% or more of particles having a divided size of 0.2 µm. Within the interior of the circular-columnar case member whose outside diameter is 54 mm, over the length of approximately 60 mm as measured from the upper end, the adsorbent is filled and, over the length of approximately 50 mm as measured from the lower end, the hollow fiber membrane is filled.

Figure 3A:
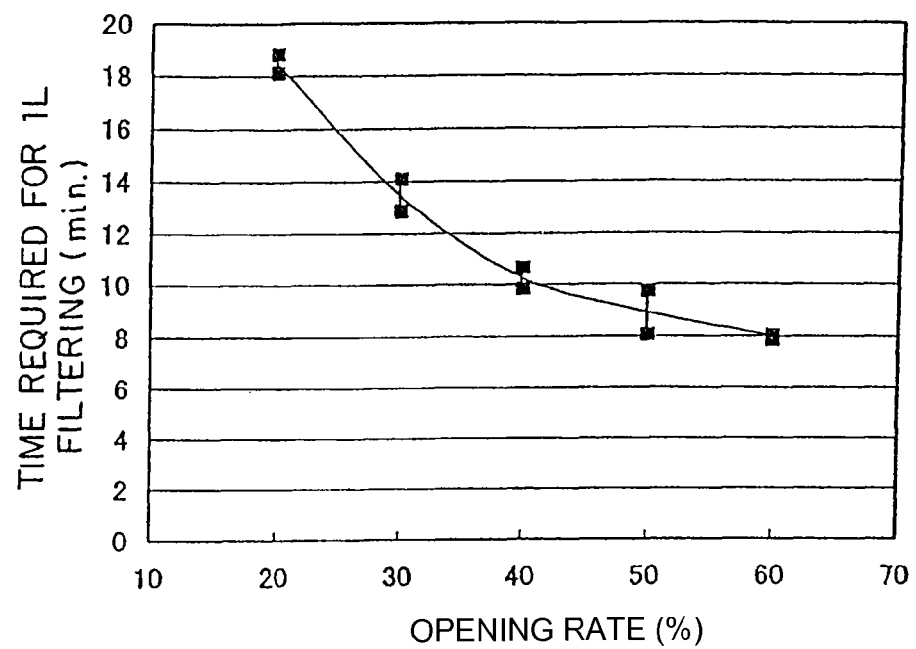

Graphs in each of which there is plotted the relationship between the opening rate of the hollow fiber membrane 27b and the filter performance of it under the assumption that the membrane area of the hollow fiber membrane 27b be fixed are illustrated in FIG. 3. The graphs of FIGS. 3A and 3B show the results that have been obtained by performing filtering with the use of the pitcher type water purifier according to the first embodiment of the present invention, showing the time period (minutes) required to filter 1L of water with its own weight and the flow rate of filtration (L/min./m$^2$) per membrane area.

First, a pressure of 0.1 MPa was applied to only the purification cartridge 20 as a single unit and, in this condition, water was passed through it, to thereby wet the hollow fiber membrane. Thereafter, water was filtered with its own weight. The filtration test was conducted on each of the filling densities by the use of two purification cartridges. The black square point marks in the Figures are the plotting of each results.

The membrane area at each opening rate is as illustrated in Table 1 below.

TABLE 1

| Opening Rate (%) | Membrane area (m$^2$) |
|---|---|
| 20.1 | 0.065 |
| 30.2 | 0.098 |
| 40.2 | 0.130 |
| 50.3 | 0.163 |
| 60.0 | 0.194 |

As apparent from FIG. 3A, in a case where the opening rate of the hollow fiber membrane 27b is varied, as the opening rate increases, the time period needed to filter 1L of water shortens. However, the extent to which the filtering time period shortens decreases with an increase in the opening rate. For example, in a case where the opening rate has been increased from 20% to 40%, the filtering time period shortens about 8 minutes. However, even in a case where the opening rate has been increased from 40% to 60%, the shortened time period is only two minutes. Here, when this is converted to the flow rate of filtration per unit membrane area, it is seen that the flow rate decreases with an increase in the opening rate, namely that as the opening rate increases the entire membrane ceases to be utilized uniformly.

In this way, unlike the water purifier which is used with the water line capable of applying 0.1 MPa or more of pressure, in the pitcher type water purifier which performs filtration with the use of the water's own weight resulting from the head level of 5-30 cm or so, i.e. with the use of a very low pressure of 0.0005-0.003 MPa or so, the filter performance is greatly affected by the opening rate of the membrane. Therefore the opening rate of the membrane should be strictly set.

In a case where the opening rate of the membrane is 60% or more, even when increasing the membrane area, the filtering time period almost does not shorten. Therefore, the upper limit of the opening rate is preferred to be 58% or less. Also, in a case where the opening rate is less than 25%, 15 minutes or more is needed to filter the water of 1 L, which is not preferable. When the opening rate is within a range of 30-55%, the time period that is needed to filter 1L of water is only to be from about 13 mins. to 9 mins. On the other hand, the flow rate of filtration per unit membrane area does not greatly vary, either, and therefore the membrane is relatively uniformly utilized, which is preferable. Furthermore, it is most preferable, from the standpoint of making compatible the water passage rate and the membrane utilization efficiency, that the opening rate be set to be 35-52%.

Also, in a case where using an activated carbon as adsorbent, it is preferable that the filling amount of that activated carbon be set to be 10-200 g; and the total membrane area of the hollow fiber membranes be set to be 0.1-1.0 m$^2$. Namely, preferably, the filling amount of adsorbent and the total membrane area of the hollow fiber membrane are suitably changed within such ranges according to the components, purpose and the performance of the raw water.

In the above-described pitcher type water purifier 1, supply of a raw water into the interior (the raw water reservoir portion 1a) of the second main body portion 12 permits the raw water to be introduced from the raw water inlets 23 of the purification cartridge 20, which has been amounted on the bottom portion of the second main body portion 12, into the interior of the purification cartridge 20. And, chlorine or chemical substances such as trihalomethane are adsorbed and eliminated by the adsorbent 26. Thereafter, bacteria or microbes are further filtered by the hollow fiber membrane 27b, whereby the water is let out from the purified water outlets 24 into the purified water reservoir portion 1b of the first main body portion 11.

The speed, at this time, at which the raw water passes through the purification cartridge 20 depends upon the water passage rate of the hollow fiber membrane 27b. However, by making the opening rate of the hollow fiber membrane 27b 30-55% as stated above, a sufficient water passage rate as a pitcher type water purifier is ensured.

In addition, the purified water that has been obtained using the above-described purification cartridge 20 has no bacteria or microbes, which are completely filtered and eliminated therefrom by the hollow fiber membrane 27b. Therefore, where having preserved the purified water containing no chlorine therein for a long period of time, as well, there is no possibility that bacteria or microbes will propagate themselves. Therefore, that purified water is excellent in terms of safety.

Incidentally, as stated above, by setting the opening rate of the hollow fiber membranes to be a value within the above-described range, the water passage rate has been able to be enhanced up to a value enabling the pitcher type water purifier to be used as itself. However, comparing to the use of the conventional purification cartridge having filled therein only such an adsorbent as activated carbon and ion-exchange resin, the water passage rate is low.

Figure 4:
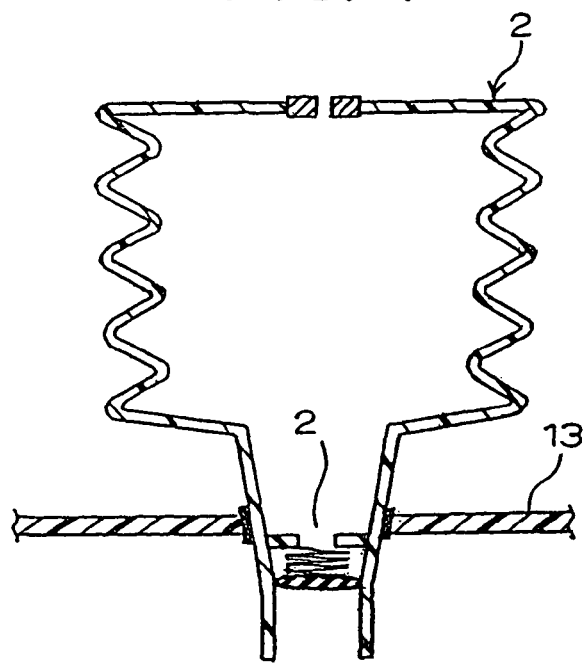
FIG. 4 is a sectional view of a pressurizing pump.

To increase the water passage rate, it is also considered to, for example, dispose a packing on the peripheral edge of the lid member 13 of the casing 10 to thereby enable the lid member 13 to be closely sealed to the second main body 12. Simultaneously, a pressurizing pump 2 having formed therein a check valve 2a such as that illustrated in FIG. 4 is mounted to the lid member 13 to thereby forcedly feed the raw water into the purification cartridge 20. It is thereby possible to increase the water passage rate of the purification cartridge 20 and thereby remarkably increase the purification processing rate.

Incidentally, as other conventional known pressurizing pumps, their basic structure is disclosed, for example, in Japanese Utility Model Application Laid-Open Nos. H4-118135, H6-39194, and H6-80684, etc.

Figure 5:
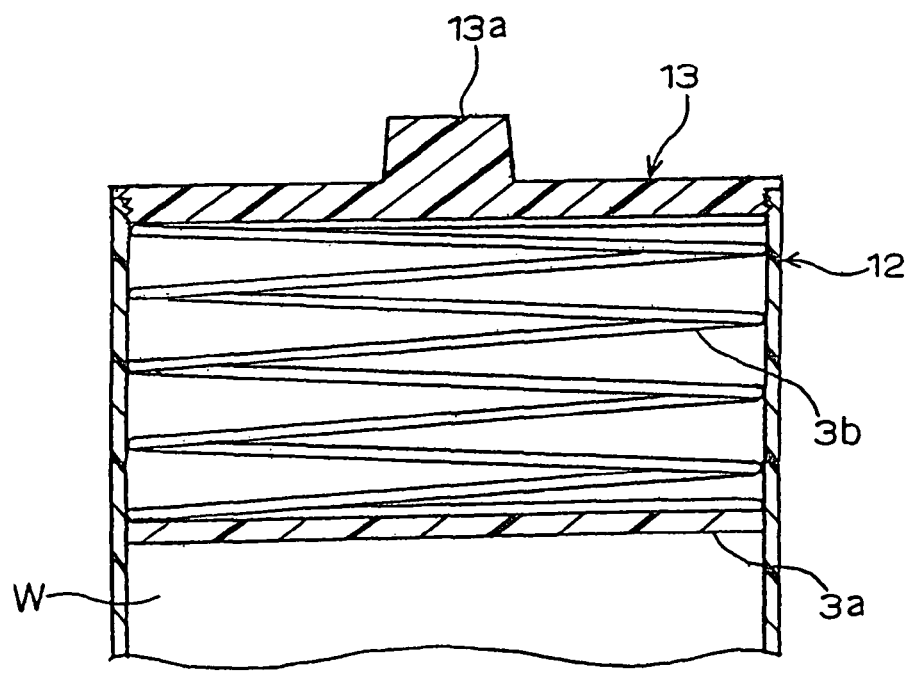
FIG. 5 is a sectional view of pressurizing means.

Or, as illustrated in FIG. 5, the lid member 13 of the casing 10 is fixed to the upper end edge of the second main body portion 12 of the casing 10 by means of, for example, screw engagement or the like. Further, a plate member 3a the specific gravity of which is lighter than that of the raw water W and the outer configuration of which is the same as the inner-peripheral configuration of the second main body portion 12 is floated on the surface of the raw water W over an entire upper surface thereof. Between this plate member 3a and the lid member 13, a compression spring 3b is disposed. By doing so, it is possible to press the raw water downward by means of the plate member 3a and thereby positively feed the raw water into the purification cartridge.

Figure 6:
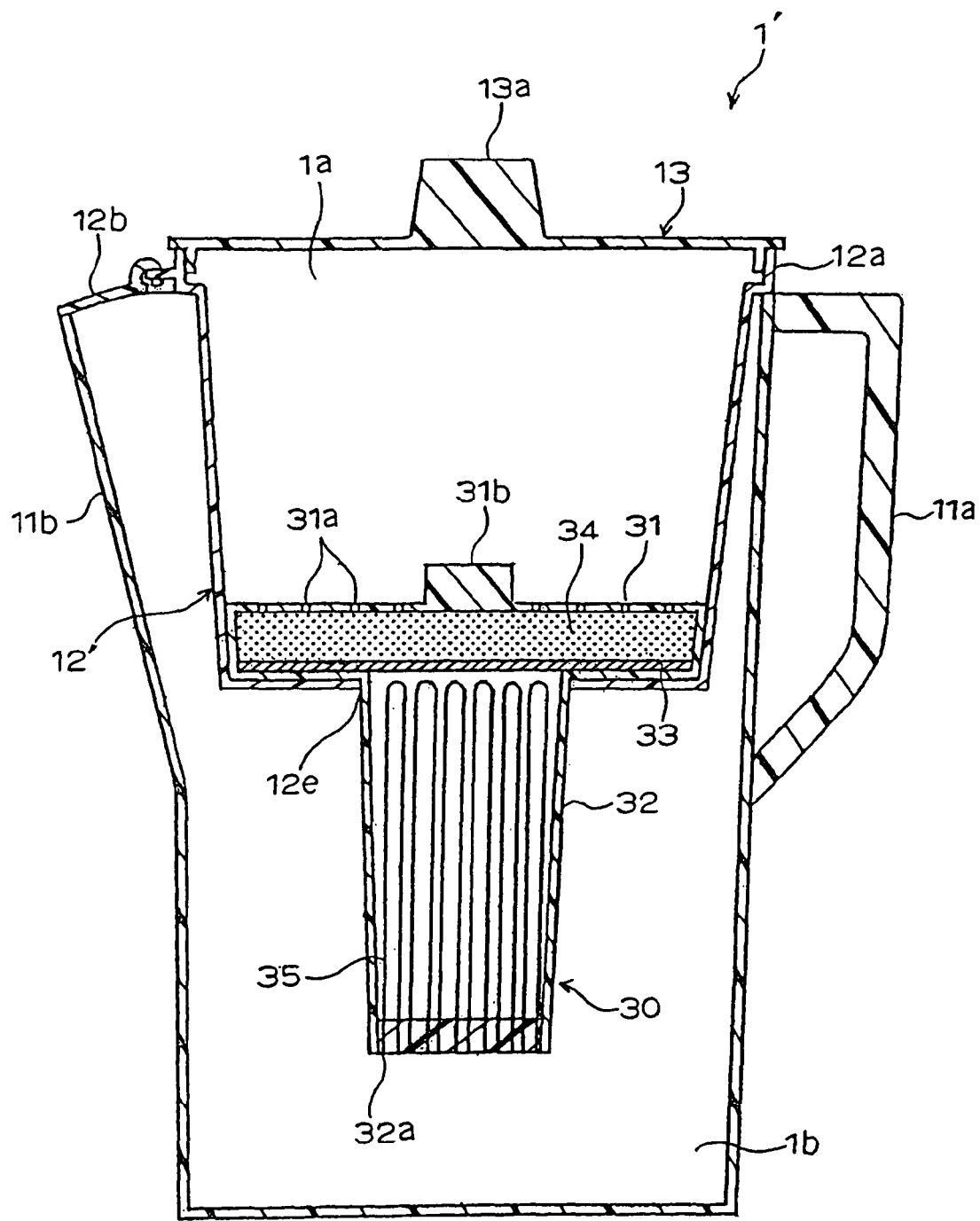
FIG. 6 is a longitudinal sectional view of a pitcher type water purifier according to a second embodiment of the present invention.

Further, utilizing the fact that the water passage rate has decreased as a result of the use of the hollow fiber membrane 27b in the purification cartridge in comparison with the use of only adsorbent alone such as that consisting of activated carbon, ion-exchange resin, or the like, it is also possible to use such a purification cartridge 30 as illustrated in FIG. 6.

Conventionally, for the purpose of ensuring a time for permitting the raw water to contact with adsorbent such as activated carbon or ion-exchange resin and the like, for sufficiently adsorbing and eliminating chlorine or trihalomethane from the raw water by the use of adsorbent such as activated carbon or ion-exchange resin and the like, a purification cartridge that is as stated above and that is longitudinally elongate circular-columnar was used and, thereby, the water was passed from the upper end to the lower end thereof to ensure a sufficient value of water passage distance. However, the above-described circular-columnar purification cartridge is caused to project into the purified water reservoir 1b and therefore is at all times immersed in the purified water stored within that purified water reservoir 1b. As a matter of course, the water is also kept entered into within the purification cartridge immersed in the purified water. In view of this, in the case of, especially, the conventional water purifier in which only adsorbent alone is filled, such entry state is not preferable from the viewpoint of sanitation as well.

In contrast, in the purification cartridge using the hollow fiber membranes, the water passage rate of the hollow fiber membrane is lower than that of the adsorbent, therefore a sufficient time for contact between the raw water and the adsorbent can be ensured, with the result that it becomes possible to shorten the height dimension of the filling portion of adsorbent.

According to a second embodiment of the present invention, as illustrated in FIG. 6, the purification cartridge 30 attached to a water purifier 1' is constructed of a flat plate portion 31 having a height of substantially 10-20 mm and having a flat surface configuration that is substantially the same as the bottom surface configuration of the second main body portion 12' of the casing 10 and a circular-columnar portion 32 projecting downward from the central part of the bottom surface of the flat plate portion 31. Between the flat plate portion 31 and the circular-columnar portion 32 there is interposed a filter 33 consisting of non-woven fabric. Adsorbent 34 is filled in the flat plate portion 31 and a hollow fiber membrane module 35 is filled in the circular-columnar portion 32. A large number of raw water inlets 31a are provided in the entire upper surface of the flat plate portion 31 while, the lower end of the circular-columnar portion 32 is made open and used as a purified water outlet 32a. Further, a lug portion 31b is projectingly provided at the center of the surface of the flat plate portion 31.

The casing 10 of the water purifier having attached thereto the purification cartridge 30 of the above-described construction is different from the former-described construction. The difference is that an opening 12e for insertion therethrough of the purification cartridge, which is used for passing the circular-columnar portion 32 of the purification cartridge 30 therethrough, is merely formed in the bottom surface of the second main body portion 12'. However, the other constructions of the casing 10 are the same as those of the former-described embodiment. Therefore, the same symbols are used to denote them and a detailed explanation thereof is omitted.

In the above-described purification cartridge 30, adsorbent is filled in the flat plate portion 31 having a flat surface configuration substantially the same as the bottom surface configuration of the second main body portion 12' constituting the raw water reservoir portion 1a. Simultaneously, a large number of the raw water inlets 31a are formed in the surface of the flat plate portion 31. The raw water can thereby be efficiently introduced into the cartridge 30 and contacted with the adsorbent 34. Also, a hollow fiber membrane module 35 is filled in the circular-columnar portion 32 projecting downward from the flat plate portion 31. And, the water passage rate of this hollow fiber membrane module 35 is low compared to that of the adsorbent 34. Therefore, the original, or non-processed, water can be allowed to stay in the flat plate portion 31 for a necessary period of time, which enables sufficiently eliminating chlorine or the like by means of adsorbent.

In this embodiment, the projection dimension of the circular-columnar portion 32 is set to be 110 mm to thereby enlarge the total membrane area of the hollow fiber membrane module 35 to thereby further increase the water passage rate. However, if it is sufficient that the water passage rate necessary as a pitcher type water purifier be obtained, the total membrane area of the hollow fiber membrane module 35 may be made small and the projection dimension of the circular-columnar portion 32 may thereby be set to be 50 mm or so. If making small the projection dimension of the circular-columnar portion 32 in that way, this circular-columnar portion 32 becomes unlikely to be immersed within the purified water that is kept stored in the purified water reservoir 1b, which is preferable from the standpoint of sanitation as well.

Figure 7:
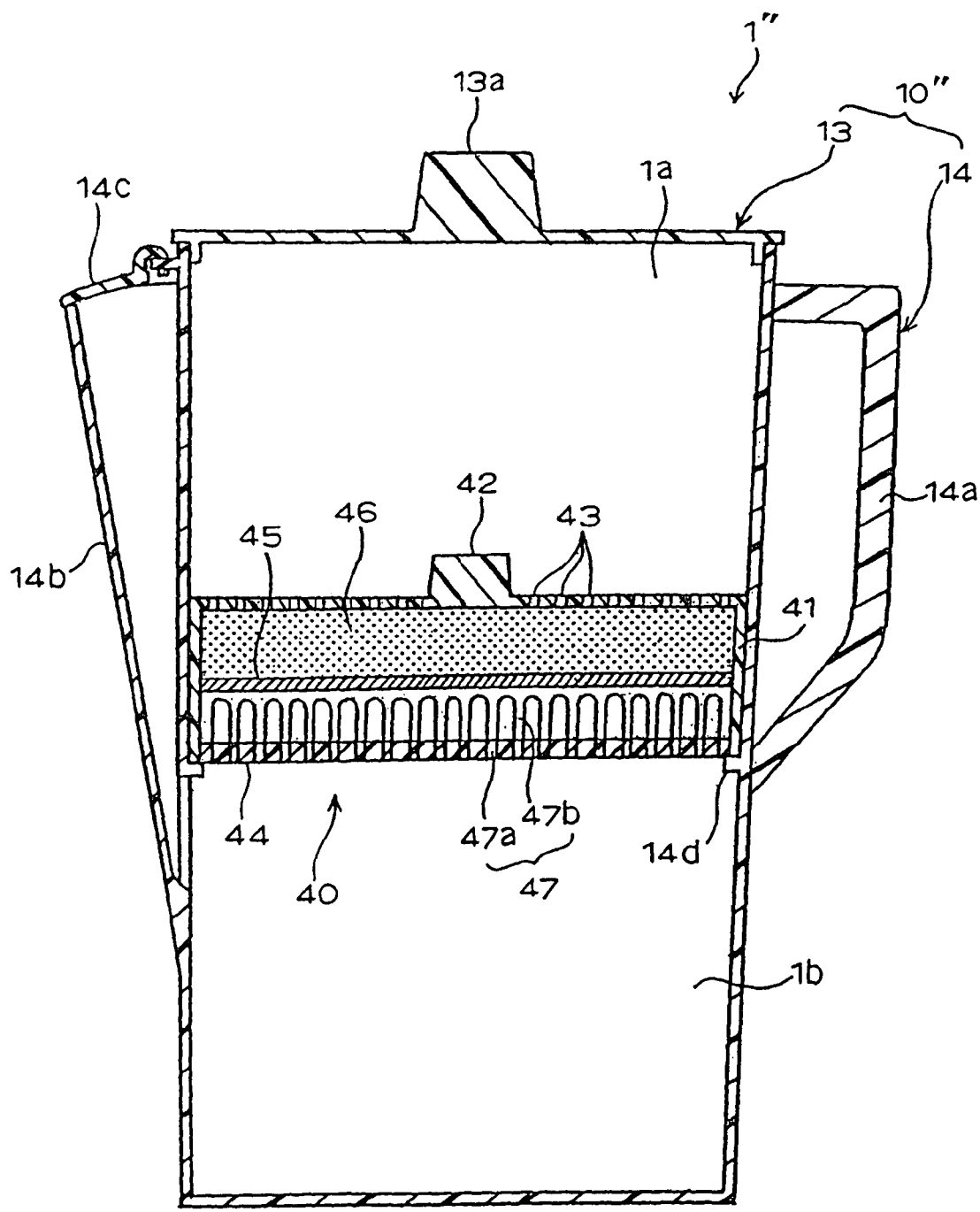
FIG. 7 is a longitudinal sectional view of a pitcher type water purifier according to a third embodiment of the present invention.

According to a third embodiment of the present invention illustrated in FIG. 7, a pitcher type water purifier 1" is constructed of a casing 10" and a purification cartridge 40.

The casing 10" is constructed of a main body portion 14 the upper end of which is open and the lid member 13 that closes the upper end of the opening of the main body portion 14 and at the center of that the lug portion 13a is formed. The main body portion 14 has formed thereon the handle 14a and the pouring opening 14b integrated therewith, the pouring opening 14b being closable by the substantially triangular lid piece 14c. Further, on the substantially central part of the inner wall surface over the entire circumferential surface thereof there is projectingly provided a rib 14d for attachment of the purification cartridge.

The purification cartridge 40 consists of a thick plate body that has a flat surface configuration that is substantially the same as the opening configuration at the portion, where the rib 14d is projectingly provided, of the main body portion 14 of the casing 10". This purification cartridge 40 is placed on the rib 14d of the casing 10". Thereby, the interior of the casing 10" is partitioned into upper and lower parts by means of the purification cartridge 40. And the upper side of the purification cartridge 40 constitutes the raw water reservoir portion 1a while the lower side thereof constitutes the purified water reservoir 1b. Incidentally, although no illustration is made in FIG. 7, it is also possible to tightly fit both of the main body 14 and the purification cartridge to each other by adopting a seal structure wherein an O-ring or gasket is interposed between the both.

The purification cartridge 40 comprises a hollow-cylindrical case member 41 whose upper end is closed, and the closed upper end is formed with a lug portion 42 and a large number of raw water inlets 43. On the other hand, the lower end of the case member 41 is as a whole made open to constitute a purified water outlet 44. At a substantially central portion of the interior of the purification cartridge 40 there is disposed a filter 45 consisting of non-woven fabric, whereby the interior of the case member 41 is partitioned into upper and lower parts. In the upper half portion of the interior of the case member 41 there is filled the adsorbent 46. And, into the lower half portion, a hollow fiber membrane module 47 is fitted in a state where the opening end portion of a hollow fiber membrane 47b, which has been fixed by a potting material 47a, is in coincidence with the purified water outlet 44.

In the above-described purification cartridge 40, by forming a large number of the raw water inlets 43 on the surface of the purification cartridge 40, it is possible to enlarge the opening area of the raw water inlets, to increase, at the same time, the number of the opening end portions of the hollow fiber membranes and, therefore, to enhance the filtering efficiency performed using the hollow fiber membranes. For this reason, it is possible to remarkably enhance the processing rate of the raw water. Furthermore, this purification cartridge 40 has no portion that projects into the purified water reservoir portion 1b and that is immersed in the purified water, which is preferable from the standpoint of sanitation as well.

Figure 8:
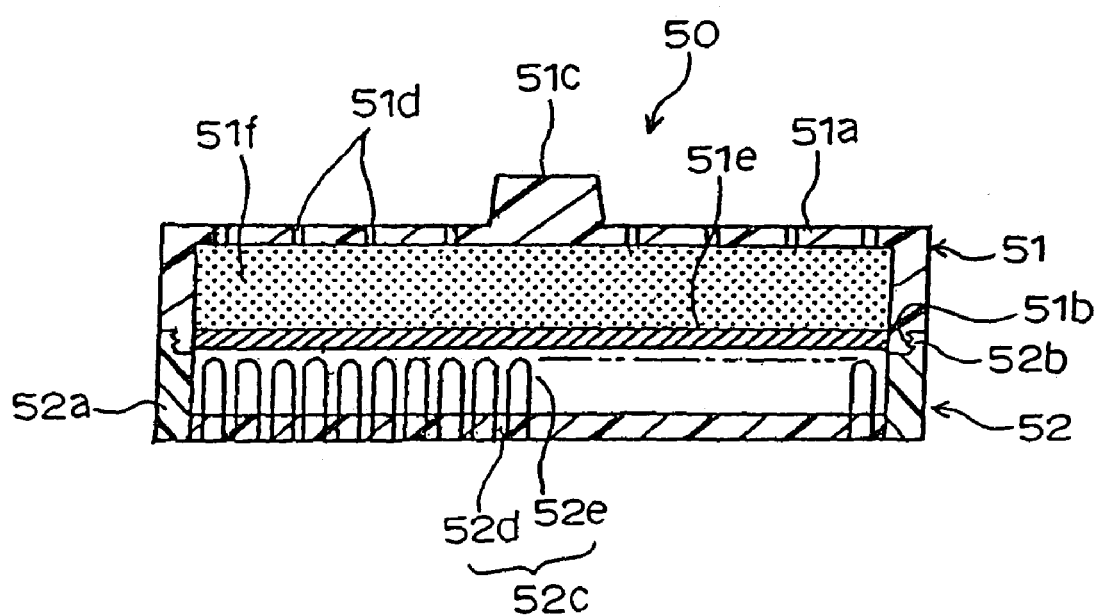
FIG. 8 is a longitudinal sectional view of a purification cartridge according to a fourth embodiment of the present invention.

FIG. 8 illustrates a fourth embodiment of the present invention.

As illustrated in the figure, a purification cartridge 50 as a whole consists of a thick plate body and is dividable into an upper layer portion 51 and a lower layer portion 52. The upper layer portion 51 comprises a case member 51a the upper surface of that is closed, and, in the edge of the open lower end of the case member 51a, there is formed a threaded groove 51b that is engagement means with the lower layer portion 52. A lug portion 51c and a large number of the raw water inlets 51d are formed with respect to the upper surface portion of the case member 51a. The end edge of the open side end is closed by a filter 51e consisting of non-woven fabric, and, within the upper layer portion 51, there is filled an adsorbent 51f.

On the other hand, in the lower layer portion 52, at the upper end edge of the case body 52a, which consists of a cylindrical body both ends of which are open, there is formed a threaded groove 52b which is engagement means with the upper layer portion 51. Further, in the interior of the lower layer portion 52, hollow fiber membranes module 52c is fitted in a state where the end portions of the openings of a hollow fiber membranes 52f fixed by means of potting material 52d are in coincidence with the lower end edge of the case member 52a.

This purification cartridge 50 is formed in the way the upper layer portion 51 filled with the adsorbent 51f and the lower layer portion 52 filled with hollow fiber membranes 52e are separable from each other through the use of the screw engagement. For this reason, the adsorbent 51f and the hollow fiber membrane 52f can be independently replaced according to their respective service lives, so waste is avoided.

Incidentally, in this embodiment, the upper layer portion 51 and the lower layer portion 52 are fixed through the utilization of the screw engagement. However, a stepped portion for allowing the upper layer portion to be simply placed on the lower layer portion from above may be only formed. Or, a seal member such as an O-ring, gasket, etc. can be interposed in between.

The invention claimed is:

1. A pitcher water purifier comprising a casing divided into upper and lower parts, as a raw water reservoir portion and a purified water reservoir portion, and having a purified water pouring opening in communication with the purified water reservoir portion and a disposable purification cartridge placed in communication between the raw water reservoir portion and the purified water reservoir portion, the purification cartridge comprising:

at least one raw water inlet, at least one purified water outlet, a single case member having an interior, and a filter dividing the interior of the single case member into an upper part and a lower part, wherein an adsorbent is filled in said upper part of the interior of the single case member, and is in communication with the raw water inlet, and hollow fiber membranes, each having a cross-sectional area based on the outer fiber diameter, which includes an interior cross-sectional area based on the hollow portion of the hollow fiber membrane, are filled in a filling space whose cross-sectional area is constant and communicate with the purified water outlet in said lower part of the interior of the single case member, said raw water reservoir portion configured to deliver a very low water pressure of about 0.0005-0.003 MPa, which corresponds to a water head difference of between about 5-30 cm in said raw water reservoir portion;

a percentage s (%) of a total of the cross-sectional area of the hollow fiber membranes filled in the filling space to the cross-sectional area of the filling space is 25-58%, the percentage s being defined as:

$$s\ (\%) = \{(A \times F)/S\} \times 100;$$

in which A represents the cross-sectional area based on the outside diameter of one of the hollow fiber membranes to be filled, F represents the total number of openings that are in communication with the purified water outlet in said hollow fiber membranes and S represents the cross-sectional area of the space with which said hollow fiber membranes are filled in said purification cartridge;

when the purification cartridge is placed in the pitcher water purifier, the adsorbent does not remain in contact with the purified water; and the upper part filled with the adsorbent is separable from the lower part filled with the hollow fiber membranes through use of a screw engagement.

2. A pitcher water purifier according to claim 1, wherein the casing comprises pressurizing means for applying pressure to the raw water reservoir portion so as to increase the water head difference.

3. A pitcher water purifier according to claim 2, wherein the pressurizing means comprises a pressurizing pump.

4. A pitcher water purifier according to claim 1, wherein the purification cartridge has a columnar configuration, the upper part thereof filled with the adsorbent has the raw water inlet, and the lower part filled with the hollow fiber membranes has the purified water outlet.

5. A pitcher water purifier according to claim 1, wherein the adsorbent comprises activated carbon in an amount filled of 10-200 g; and a total membrane area of the hollow fiber membranes is 0.1-1.0 m².

* * * * *